United States Patent [19]

Herndon

[11] Patent Number: 4,749,153
[45] Date of Patent: Jun. 7, 1988

[54] EJECTION SEAT STABILIZING APPARATUS AND METHOD

[75] Inventor: Gerald F. Herndon, Bellevue, Wash.

[73] Assignee: The Boeing Company, Seattle, Wash.

[21] Appl. No.: 782,222

[22] Filed: Sep. 30, 1985

[51] Int. Cl.$^4$ .............................................. B64D 25/10
[52] U.S. Cl. ........................ 244/122 AB; 244/122 A; 244/141
[58] Field of Search ........ 244/122 R, 122 A, 122 AB, 244/122 AD, 122 AE, 122 AG, 138 R, 138 A, 140, 141

[56] References Cited

U.S. PATENT DOCUMENTS

| | | | |
|---|---|---|---|
| 2,918,235 | 12/1959 | Aburg et al. | 244/138 A |
| 2,931,598 | 4/1960 | Sanctuary | 244/122 AD |
| 2,999,659 | 9/1961 | Martin | 244/141 |
| 3,047,259 | 7/1962 | Tatnall et al. | 244/138 A |
| 3,648,955 | 3/1972 | Stencel et al. | 244/122 AD |
| 3,662,978 | 5/1972 | Hollrock | 244/122 A |
| 4,470,565 | 9/1984 | Zenobi et al. | 244/141 |

Primary Examiner—Joseph F. Peters, Jr.
Assistant Examiner—Rodney Corl
Attorney, Agent, or Firm—Joan H. Pauly

[57] ABSTRACT

Inner catapult tubes (8) of aircraft (2) are pivotably mounted on the upper rear portion of ejection seat (12). When they separate from outer catapult tubes (4), tubes (8) pivot upwardly and rearwardly to form stabilizing booms (8). A drag device (30,30',30") is stowed inside the outer end of each boom (8) and extends axially outwardly therefrom upon deployment to apply a small drag load to the upper portion of seat (12) and counteract a tendency of seat (12) to pitch forward during operation of stabilization control rockets (18,20). The drag surfaces of devices (30,30',30") are folded around a center shaft (32,32',32") when stowed and extend radially outwardly from shaft (32,32',32") when deployed. The drag device may be a ram air inflatable device (30), a split tube/daisy petal device (30"), or a device having spring steel ribbons (40) forming a tuft-like appendage (30'). Ribbons (40) are wound around shaft (32') when stowed and spring radially outwardly from shaft (32') upon deployment.

29 Claims, 4 Drawing Sheets

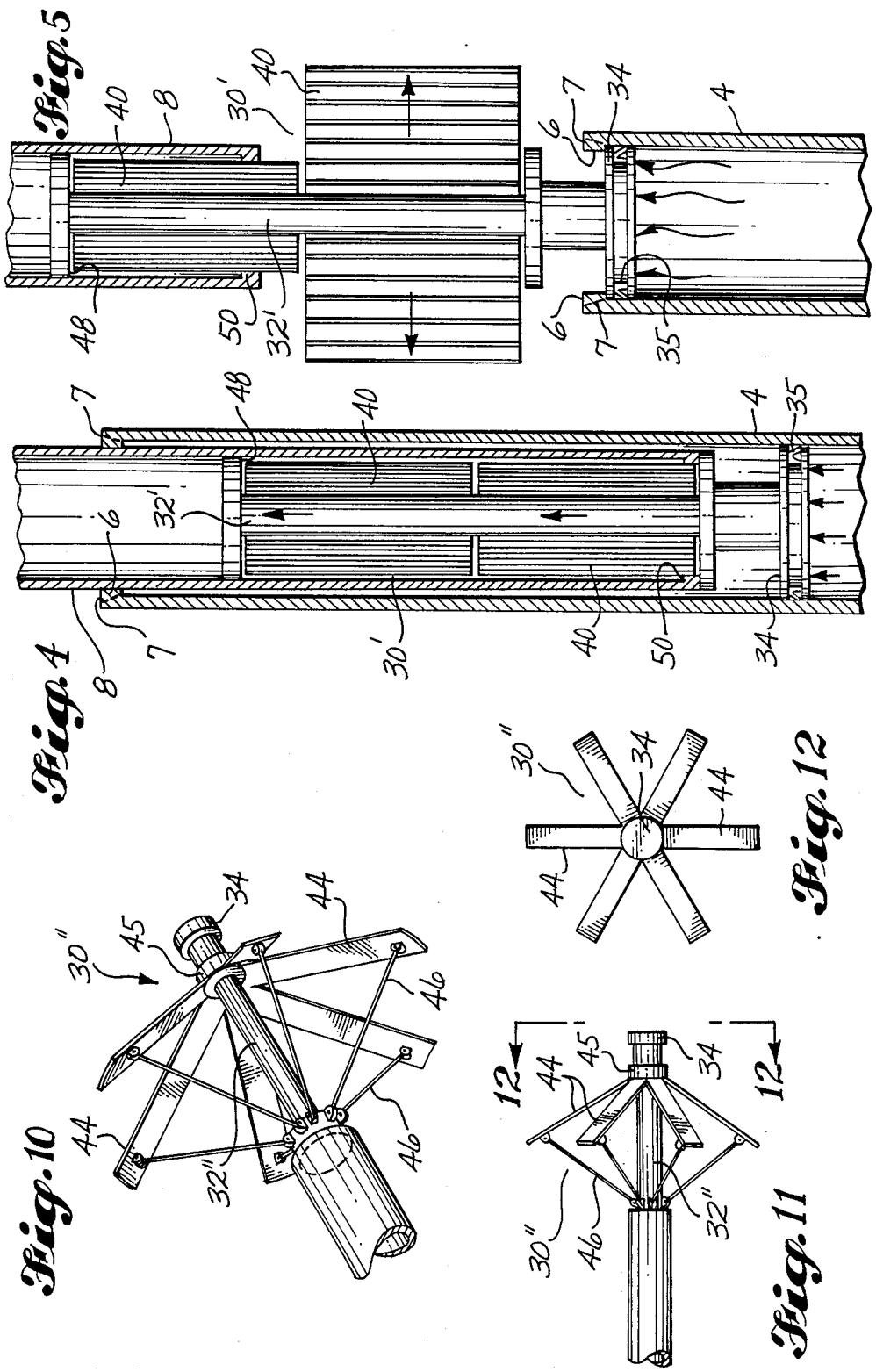

EJECTION SEAT STABILIZING APPARATUS AND METHOD

TECHNICAL FIELD

This invention relates to a method and apparatus for stabilizing ejection seats immediately after ejection and, more particularly, to such a method and apparatus in which the inner catapult tubes form stabilizing booms that are pivotably connected to the upper portion of the back of the seat, that are deployed to extend rearwardly, and that have drag devices on their outer ends to counteract the tendency of the seat to pitch forward.

BACKGROUND ART

The ejection seats that are currently being used in high performance military aircraft are inherently unstable in free flight and are subject to uncontrolled gyrations following separation from the ejection guide rails. Such gyrations create excessive dynamic loads on the seat occupant that can cause serious injury or death. Therefore, there is a need to provide ejection seats with stabilization control that is effective as soon after separation from the ejection guide rails as possible.

Currently, stabilization control is most commonly provided in the form of a drogue parachute. The parachute is deployed when sufficient aircraft tail clearance is assured to slow the seat and stabilize it for a long descent until the recovery parachute is deployed. The use of a drogue parachute for stabilization control has some serious drawbacks. In order to insure that the seat is clear of the aircraft before the drogue is deployed, the deployment is usually initiated after a fixed time delay following seat/rail separation. The time delay is preset and is based on the slowest anticipated ejection velocity and the highest anticipated air speed. This method of predetermining the time delay results in maximizing the delay between seat/rail separation and the deployment of the stabilization control. In general, any increase in the time between seat/rail separation and the deployment of stabilization control will increase the chances of the development of a divergent seat attitude and resulting serious problems in achieving subsequent recovery.

The use of a drogue parachute for stabilization control also has the disadvantage of increasing deceleration loads on the seat occupant. When the seat is ejected into a high dynamic pressure airstream, the combined deceleration load produced by the airstream and by the deployment of the drogue can be beyond human tolerance. For example, loads in excess of 25 g's are possible, and such loads are likely to be fatal. In order to avoid such excessive and dangerous loads on the occupant, drogue deployment must be delayed until the seat deceleration has decreased to a safe level. Like the delay necessary to insure clearance from the aircraft, the delay until a safe deceleration level has been achieved increases the potential for divergent seat attitude. This is particularly true when the seat is ejected where higher airstream velocities are present.

Recent developments in aircraft crew escape technology indicate that an active, rocket-powered seat attitude control system is feasible and would provide much better short term postejection stabilization than a drogue parachute. A major drawback associated with the use of rockets for stabilization is that rockets require propellant which increases the seat weight and is relatively difficult to stow within the limited space available. Most known ejection seats have the undesirable aerodynamic characteristic of a tendency to pitch forward because the center of pressure is below the center of mass. In a system that relies solely on rocket power to provide stabilization control, the pitching moment must be overcome by a component of rocket thrust, and the providing of such thrust increases the amount of propellant required.

The patent literature includes a number of different approaches to providing stabilization and control of ejection seats following ejection. Rocket-powered seat control is disclosed in U.S. Pat. Nos. 2,751,171, granted June 19, 1956, to J. Martin; 2,931,598, granted Apr. 5, 1960, to G. E. Sanctuary; 3,554,472, granted Jan. 12, 1971, to R. G. McIntyre et al; and 3,979,088, granted Sept. 7, 1976, to J. B. McCormick. Martin discloses a system in which a rocket is used in combination with a drogue parachute to slow the seat and prevent impact with the ground. In the system disclosed by Sanctuary, the seat is tilted back to reduce the aerodynamic drag of the seat and thereby control the rate of deceleration and prevent dangerous abrupt deceleration. A rocket mounted on the back of the seat below the center of gravity is fired to tilt the seat, and then a second rocket above the center of gravity is fired to oppose the tilting and stabilize the seat in its tilted position. In addition, fins having horizontal and vertical vanes are deployed above and behind the headrest to aid the second rocket in opposing tilting and stabilizing the position of the seat. McIntyre et al disclose a yaw control stabilizing rocket that is mounted on the upper portion of the back of the seat, that has a discharge opening directed downwardly and rearwardly, that is rotatably adjustable by means of a gyroscope, and that is telescopically stowed in the catapult barrel prior to deployment. McCormick discloses a control rocket that has an adjustable throat area to compensate for deviations in the seat-occupant mass center of gravity.

Means deployed by a drogue parachute for flying the ejection seat to a more favorable landing area is disclosed in U.S. Pat. Nos. 3,662,978, granted May 16, 1972, to R. H. Hollrock; 3,679,157, granted July 25, 1972, to R. A. Roberts et al; and 4,017,043, granted Apr. 12, 1977, to J. J. Barzda. Both Hollrock and Barzda disclose a system in which helicopter-type rotor blades are deployed to provide "gliding flight". The blades are stowed against the back of the seat and are pivotally connected to the top of the seat. During deployment, the blades first pivot upwardly and outwardly to a position generally normal to the back of the seat and then pivot further into a position above the seat. A pair of tail planes are also deployed by the drogue chute. The tail planes are pivotally connected to the opposite sides of the top of the seat, are adjacent to the lower portion of the sides of the seat when stowed, and pivot upwardly and rearwardly into their deployed position in which they extend upwardly and rearwardly from the seat. Hollrock states that the booms of the tail planes may serve as casings for the catapult system. Roberts et al disclose a system in which wing-like surfaces trailed by a boom ending in fins are deployed to extend rearwardly from the bottom portion of the back of the seat. The apparatus is pivotally connected to the seat and is stowed up against the back of the seat.

U.S. Pat. Nos. 2,829,850, granted Apr. 8, 1958, to I. H. Culver; and 4,261,535, granted Apr. 14, 1981, to D. E. Swanson, each disclose apparatus for stabilizing the ejection seat and reducing drag until the rate of deceleration of the seat has reduced to a level at which it is safe to deploy the drogue parachute. The Culver apparatus includes a boom that is deployed forwardly of the seat and vanes that are aerodynamically deployed to extend laterally from the sides of the seat. Swanson provides two vertical rows of inflatable air bags that are sequentially inflated by gas generators as the seat is ejected from the aircraft.

Apparatus for providing an ejection seat with yaw stabilization is disclosed in U.S. Pat. Nos. 4,319,723, granted Mar. 16, 1982, to E. R. Schultz; 4,470,565, granted Sept. 11, 1984, to T. J. Zenobi et al; and 4,480,806, granted Nov. 6, 1984, to J. W. Duncan. Schultz discloses apparatus for yaw stabilization prior to drogue deployment and during the burning phase of stabilization rockets. A vertical vane mounted on the upper portion of the back of the seat senses angular offset and extends drag paddles laterally to provide restoring moment. Zenobi et al disclose flag-shaped fins that are pivotably connected to the top portions of the opposite sides of the seat, and that are pivotably deployed to extend rearwardly from the lateral edges of the top of the seat to provide yaw stabilization apparently prior to deployment of a drogue. Duncan discloses fins mounted in the same manner as the fins of Zenobi et al that are pivotably deployed, aerodynamically by the airstream and positively by a mechanical apparatus, to provide yaw stabilization while the seat is being slowed by a drogue parachute.

The above patents and the prior art that is discussed and/or cited therein should be studied for the purpose of putting the present invention into proper perspective relative to the prior art.

DISCLOSURE OF THE INVENTION

A subject of the invention is apparatus for stabilizing an aircraft ejection seat following separation from the aircraft. According to an aspect of the invention, the apparatus comprises a boom attached to the upper rear portion of the seat. Means is provided for deploying the boom into a position in which it extends generally rearwardly from the upper rear portion of the seat. The apparatus also includes drag surface means carried by the boom for applying a small drag load to the upper portion of the seat. The boom and the drag surface means are positioned and dimensioned to raise the center of pressure of the seat toward the center of mass and to counteract a tendency of the seat to pitch forward. Such tendency is due to a pitching moment resulting from the center of pressure being below the center of mass.

According to another aspect of the invention, the aircraft includes ejecting means for ejecting the seat from the aircraft. The ejecting means includes an outer catapult tube attached to the aircraft and an inner catapult tube telescopically received into the outer tube. The boom is formed by the inner catapult tube. By this arrangement, the inner catapult tube has two separate functions, ejecting the seat from the aircraft and stabilizing the seat following ejection. The use of the catapult tube as the boom permits the stabilizing apparatus of the invention to be added to an ejection seat without adding any significant amount of weight and without occupying a significant amount of the limited stowage space available on the ejection seat.

According to a preferred aspect of the invention, the drag surface means comprises drag surface portions of a drag device that is telescopically received into the inner catapult tube prior to deployment of the boom. The apparatus has extending means for pulling the drag device, during deployment of the boom, into a position in which it extends axially outwardly from the inner catapult tube. In the preferred embodiment, the extending means includes a lip carried by the drag device, and bearing means carried by the outer catapult tube at its outer end. The bearing means is positioned to engage the lip, just prior to separation of the inner tube from the outer tube, to pull the drag device out from the inner tube. The stowing of the drag device telescopically in the inner catapult tube and the provision of the extending means help to minimize the stowage space required by the drag device and to insure that the drag device is properly deployed without interferring with the ejection of the seat from the aircraft. The preferred embodiment of the extending means has the advantages of being simple in construction and of not requiring any additional apparatus. The bearing means performs the function of guiding the inner catapult tube as it moves out from the outer tube, as well as the function of extending the drag device.

A preferred feature of the invention is a drag device that includes a center axial shaft, said drag surface portions, and spring means. The drag surface portions fold around the shaft when the drag device is stowed inside the inner catapult tube. The spring means unfolds the drag surface portions to extend generally radially outwardly from the shaft when the drag device is pulled out from the inner catapult tube. This preferred feature helps to minimize the stowage space required by the drag device while insuring the proper deployment of the device. In a preferred embodiment, the drag surface portions comprise a plurality of spring steel ribbons. Each of the ribbons has an inner end that extends axially along and is secured to the shaft. The ribbons are positioned circumferentially around the shaft to wrap spirally around the shaft when in a stowed position and to extend generally radially from the shaft when deployed. This preferred embodiment of the drag surface portions has the advantages of maximizing the ratio of drag surface provided to stowage space required and of providing reliable and automatic movement of the drag surface portions from a stowed position to a deployed position upon extension of the drag device out from the inner catapult tube.

According to another aspect of the invention, the apparatus for stabilizing an aircraft ejection seat following separation from the aircraft comprises the improvement described above in combination with a drogue parachute and rocket means for controlling the seat attitude prior to deployment of the drogue parachute. The drag surface means of the improvement applies the small drag load to the upper portion of the seat while the rocket means is being operated. This counteracts the tendency of the seat to pitch forward, as discussed above. The combination of elements comprising this aspect of the invention makes it possible to reduce the amount of propellant required by the rocket means for controlling the seat attitude. This in turn decreases the amount of weight added by the rocket propellant and the amount of stowage space required for the propellant. The combination provides an effective, efficient, and economical means for stabilizing the ejection seat.

Another subject of the invention is a method of counteracting a tendency of an aircraft ejection seat to pitch forward following separation from the aircraft. In its basic form, the method comprises applying a small drag force to the upper portion of the seat to raise the center of pressure of the seat toward the center of mass by deploying a boom having drag surface means to extend generally rearwardly from the upper portion of the seat. According to a preferred aspect of the invention, the ejection seat is separated from the aircraft by means of a catapult system, the boom is formed by an inner catapult tube, and the deploying of the boom includes pivoting the inner catapult tube into a position in which it extends generally rearwardly from the seat.

Still another subject of the invention is a method of stabilizing an ejection seat following separation from an aircraft. According to an aspect of the invention, the method comprises operating rockets carried by the seat to control the seat attitude, and deploying a drag device. The drag device is deployed to extend generally rearwardly from the upper portion of the seat while the rockets are being operated, to apply a small drag force to the upper portion of the seat and raise the center of pressure toward the center of mass. This counteracts a tendency of the seat to pitch forward and, in turn, reduces the need for rocket propellant. In the preferred embodiment, the rockets are operated to control the seat attitude until the seat has cleared the aircraft and has slowed to a safe deceleration level. A drogue parachute is deployed to stabilize the seat following operation of the rockets.

The method and apparatus of the invention provide stabilization control for aircraft ejection seats that is effective essentially immediately after separation of the ejection seat from the aircraft. The invention also makes it possible to delay deployment of a drogue parachute until the seat has safely cleared the aircraft and deceleration has reduced to a safe level, without risking the development of uncontrolled gyrations of the seat or a divergent seat attitude that could result in serious problems in achieving subsequent recovery. The method and apparatus of the invention are effective to provide safe stabilization control even where higher airstream velocities are present. In addition, when used in combination with stabilization rockets, the improvements of the invention reduce the amount of rocket propellant required for effective stabilization control and, thereby, reduce the weight of the rocket stabilization system and the stowage space required therefor.

These and other advantages and features will become apparent from the detailed description of the best modes for carrying out the invention that follows.

BRIEF DESCRIPTION OF THE DRAWINGS

In the drawings, like element designations refer to like parts throughout, and:

FIG. 4 is an enlarged sectional view of the bottom portion of the inner catapult tube and the top portion of the outer catapult tube when the inner tube is nearing separation from the outer tube, illustrating another preferred embodiment of the drag device.

FIG. 5 is like FIG. 4 except that it shows the inner tube separated from the outer tube and the drag device being pulled out from the inner tube.

FIG. 9 is a pictorial view of the drag device shown in FIG. 1.

FIG. 10 is a pictorial view of a third preferred embodiment of the drag device.

FIG. 11 is an elevational view of the device shown in FIG. 10.

FIG. 12 is a rear elevational view taken along the line 12—12 in FIG. 11.

BEST MODES FOR CARRYING OUT THE INVENTION

Figure 1:
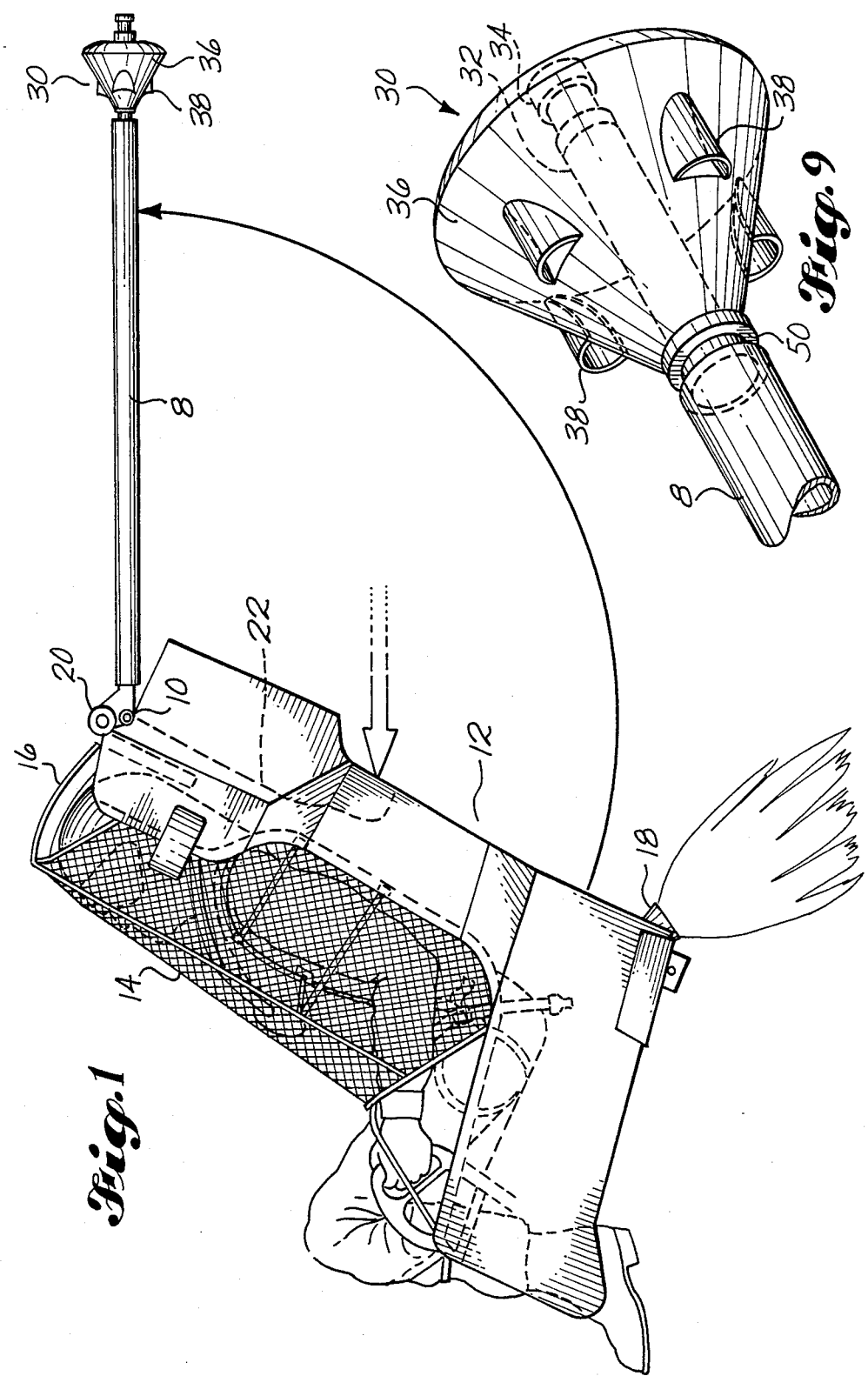
FIG. 1 is a side elevational view of a preferred embodiment of the apparatus of the invention incorporated into an aircraft ejection seat, showing the ejection seat separated from the aircraft and the apparatus in a deployed position.

The drawings show stabilizing apparatus that is constructed according to the invention and that also constitutes the best modes of the apparatus of the invention currently known to the applicant. The drawings also illustrate the best modes for carrying out the method of the invention currently known to the applicant. In the drawings, the apparatus is shown installed on an aircraft ejection seat 12 associated with an aircraft 2. It is anticipated that the primary application of the method and apparatus of the invention will be in connection with ejection seats of the type shown in the drawings. However, it is of course to be understood that the method and apparatus of the invention can also be used to advantage in connection with other types of ejection seats.

Figure 3:
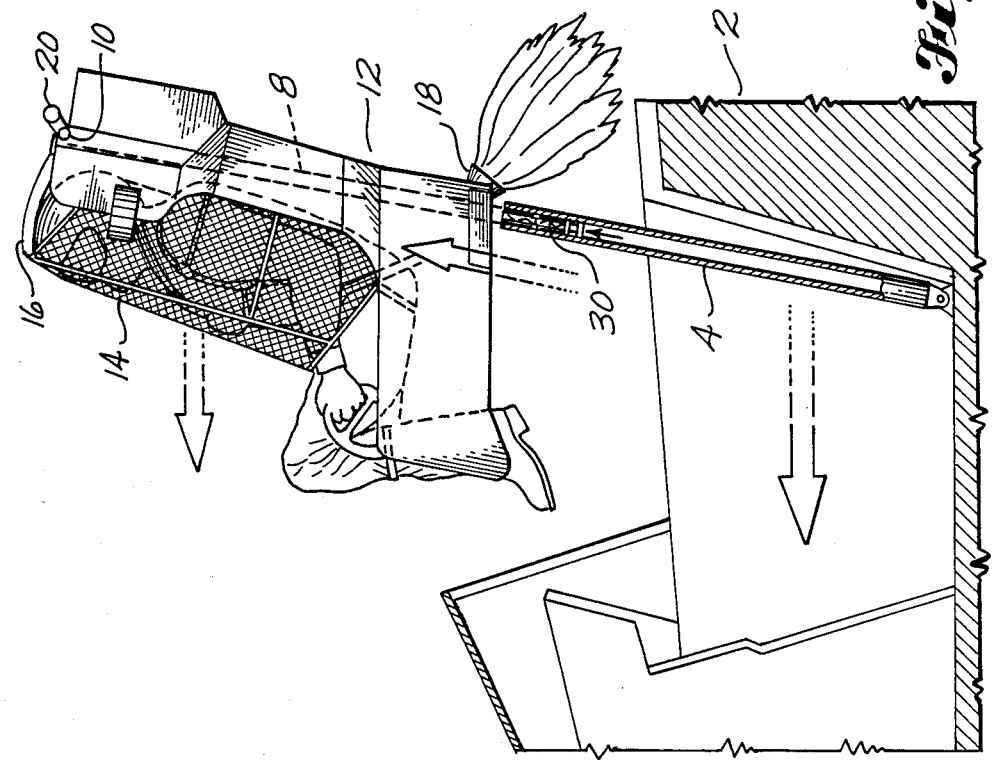
FIG. 3 is a side elevational view, with parts shown in section, of the seat and apparatus shown in FIGS. 1 and 2, showing the seat separating from an aircraft and the inner catapult tube moving out from the outer catapult tube.

FIG. 3 shows the seat 12 being ejected from the aircraft 2 and approaching separation from the aircraft 2. The ejecting apparatus of the aircraft 2 includes a pair of outer catapult tubes 4 that are secured to the aircraft and extend upwardly along the rear of the seat 12 prior to ejection of the seat 12. The ejection apparatus also includes a corresponding pair of inner catapult tubes 8 that are telescopically received into the outer tubes 4. Upon ejection of the seat 12, the inner catapult tubes 8 move upwardly and outwardly from the outer catapult tubes 4 in a known manner to move the seat 12 upwardly and outwardly from the aircraft 2. When the inner catapult tubes 8 clear the outer catapult tubes 4, the separation of the seat 12 from the aircraft 2 is completed. FIG. 3 illustrates the ejection operation just prior to separation of the outer and inner tubes 4, 8.

The seat 12 includes a number of features that are not a part of the present invention. For example, the seat 12 has means for restraining the limbs and head of the seat occupant following ejection. Such means are necessary in order to prevent loss of the occupant's helmet and injury to the occupant caused by flailing of the limbs. The restraining means shown in FIGS. 1 and 3 is of the type disclosed in the applicant's copending application, Ser. No. 655,922, filed on Sept. 28, 1984, and entitled Ejection Seat Restraint System for Limbs and Head, the disclosure of which is hereby incorporated by reference into this application. The restraining apparatus includes a net 14 and an inflatable member 16, both of which are deployed upon ejection of the seat 12. The net 14 surrounds the occupant's body and restrains the limbs, and the inflatable member 16 projects forwardly and above the occupant's helmet to prevent loss of the helmet.

Figure 2:
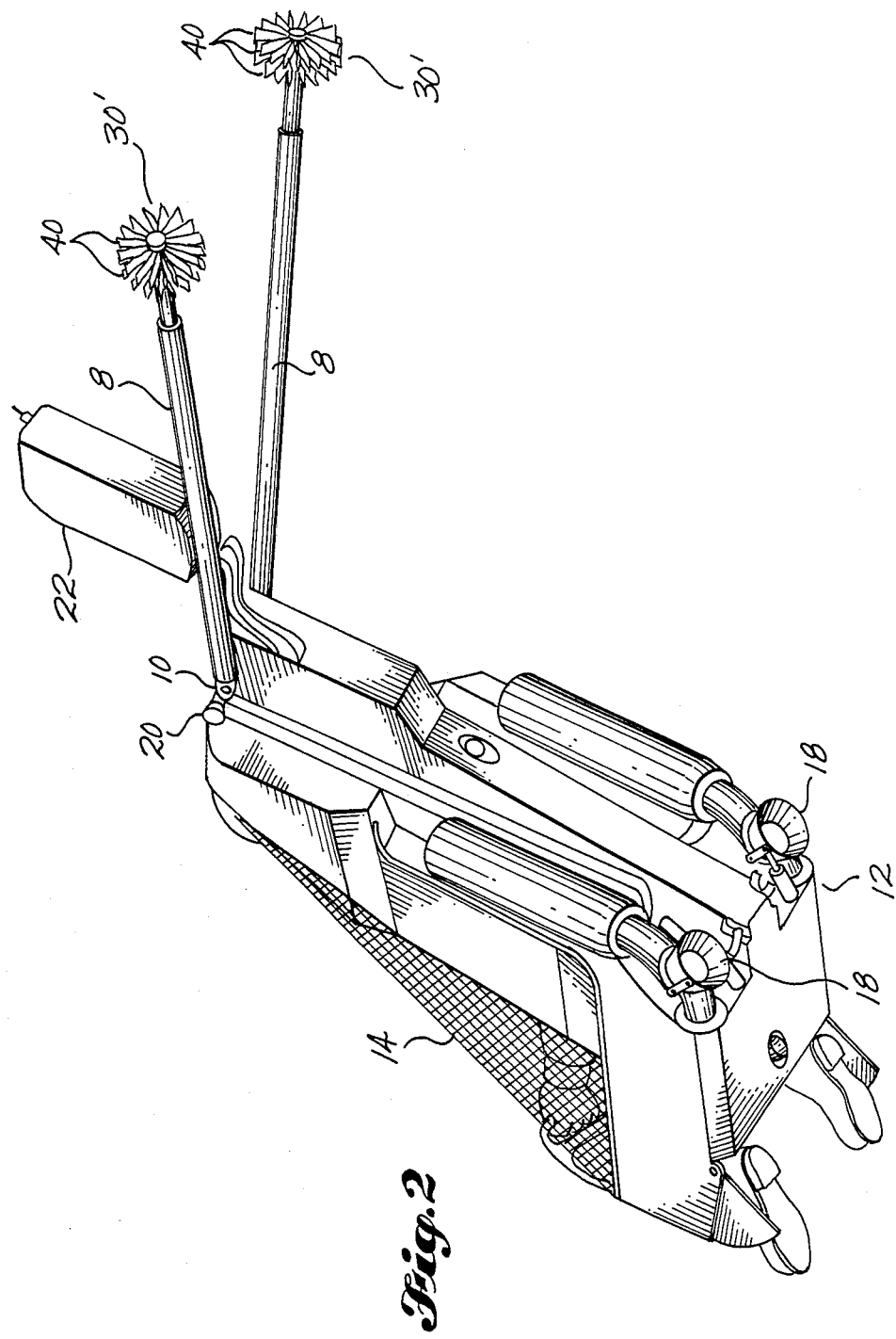
FIG. 2 is a pictorial view of the seat and apparatus shown in FIG. 1.
Figure 8:
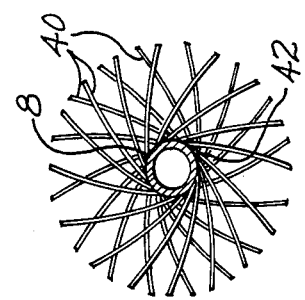
FIG. 8 is a sectional view taken along the line 8—8 in FIG. 7.
Figure 7:
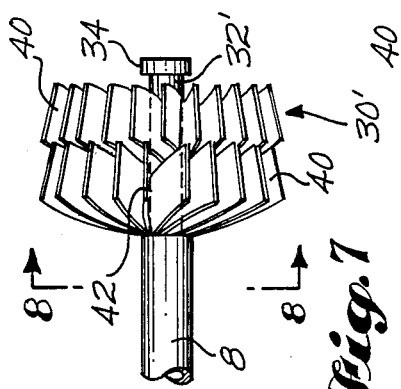
FIG. 7 is an elevational view of the device shown in FIGS. 4 and 6.
Figure 6:
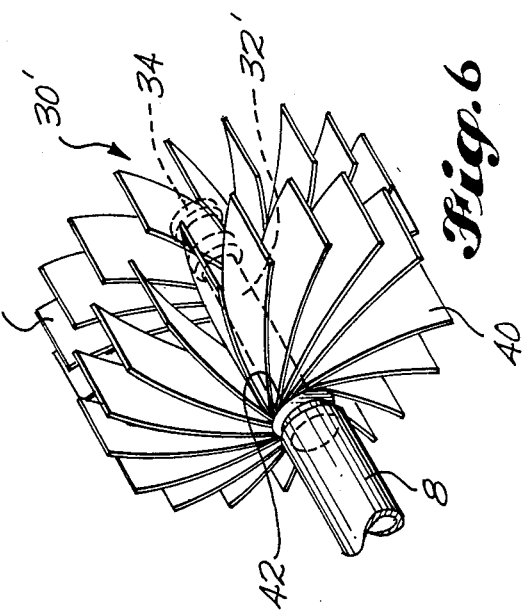
FIG. 6 is a pictorial view of the drag device shown in FIGS. 4 and 5.

The ejection seat 12 shown in FIGS. 1–3 also includes stabilizing means that cooperates with the pitch control stabilizing means of the invention to control the seat 12 following ejection. The stabilizing means includes a pair of rockets 18 positioned at the lower rear corners of the seat 12. These rockets 18 provide the main propulsion for the seat 12 and also provide yaw control. In order to provide such yaw control, the rockets 18 are of the thrust vector control type; i.e., the rocket nozzles are movable to change the direction of the thrust. The moving of the nozzles is preferably accomplished by a ball and socket arrangement of a known type. Additional yaw control is provided by the pair of roll thruster rockets 20 positioned on opposite sides of the top rear portion of the seat 12. These rockets 20 are directed laterally relative to the seat 12 to provide the desired roll and yaw control. The seat 12 is also provided with a drogue parachute 22 that is deployed following burnout of the rockets 18,20. FIGS. 1 and 3 show the parachute 22 in a stowed position, and FIG. 2 shows the parachute 22 being deployed. Each of rockets 18,20 and the parachute 22 may take any of a variety of known forms and therefore, will not be described further herein.

The pitch control apparatus of the invention includes a pair of booms 8, each of which has attached to its outer end a drag device 30,30′,30″. The booms 8 are formed by the inner catapult tubes 8 and are attached to the opposite sides of the upper rear portion of the seat 12, as shown in FIGS. 1–3. Before ejection of the seat 12 from the aircraft 2, the booms or inner catapult tubes 8 extend downwardly along the rear of the seat 12 inside the outer catapult tubes 4. In this stowed position, the outer or lower end of each inner tube 8 extends below the seat 12, as can be seen in FIG. 3. The booms 8 also have a deployed position in which they extend generally rearwardly from the upper rear portion of the seat 12. This position is shown in FIGS. 1 and 2.

The apparatus of the invention is provided with means for moving the booms 8 from their stowed downwardly extending position into their deployed rearwardly extending position. In the preferred embodiment, this deploying means includes a pivotal connection between the inner or upper end of each boom 8 and its respective side of the upper rear portion of the seat 12. The two booms 8 are connected to and pivot about the axis of a single pivot shaft 10 carried by the upper portion of the seat 12 behind the headrest portion. The pivot shaft 10 serves to connect the two booms 8 to insure that they are deployed simultaneously and thereby avoid instability which could result from nonsimultaneous deployment of the booms 8.

The booms 8 and drag devices 30,30′,30″ attached thereto are positioned and dimensioned to apply a small drag load to the upper portion of the seat 12. This drag load has the effect of raising the center of pressure of the seat 12 toward the center of mass. Preferably, the center of pressure is raised to coincide with the center of mass. The raising of the center of pressure counteracts a tendency of the seat 12 to pitch forward. Such tendency is caused by a pitching moment resulting from the center of pressure being below the center of mass.

In the preferred embodiment of the apparatus of the invention, each drag device 30,30′,30″ is telescopically received into the corresponding inner catapult tube 8 prior to deployment of the boom formed by the tube 8. The apparatus includes extending means for pulling the drag device 30,30′,30″ into a deployed position in which it extends axially outwardly from the corresponding inner catapult tube 8. This is accomplished during deployment of the booms 8. Referring to FIGS. 4 and 5, preferably the drag device 30,30′,30″ includes a center shaft 32,32′,32″ which has a radial lip 34 on its outer or lower end. The lip 34 cooperates with bearings 6 carried by the outer catapult tube 4 at its outer or upper end to extend the drag device 30,30′,30″. The lip 34 also carries bearings 35 that cooperate with bearings 6 to guide axial movement of drag device 32′ relative to tube 4. The bearings 6 may take various known forms. The bearings 6 extend radially inwardly from the outer end of the tube 4 and are positioned to engage the lip 34 just prior to separation of the inner tube 8 from the outer tube 4. The engagement of the lip 34 by the bearings 6 pulls the drag device 30,30′,30″ out from the inner catapult tube 8 to extend axially outwardly therefrom. FIG. 4 shows the drag device 30′ approaching the outer end of tube 4. FIG. 5 shows the drag device 30′ partially pulled out from tube 8 and partially deployed.

Still referring to FIGS. 4 and 5, the inner or upper end of the drag device 30,30′,30″ is provided with a shoulder 48 formed by a radial surface of an end disk or enlarged diameter portion of the center axial shaft 32,32′,32″. The shoulder 48 extends radially outwardly to engage a radially inwardly extending lip 50 on the outer or lower end of the inner tube 8. The engagement of shoulder 48 with lip 50 limits the outward movement of drag device 30,30′,30″ with respect to inner catapult tube 8 and prevents device 30,30′,30″ from separating from tube 8. The engagement of shoulder 48 with lip 50 also pulls lip 34 free of bearings 6 to in turn pull drag device 30,30′,30″ free of tube 4. As shown in FIGS. 4 and 5, bearings 6 are attached to tube 4 by low strength shear fasteners 7 made from a material such as brass. When shoulder 48 engages lip 50, lip 34 strips bearings 6 out of tube 4 to allow lip 34 to separate from tube 4.

The drag device 30,30′,30″ preferably includes the center axial shaft 32,32′,32″ discussed above, drag surface portions, and spring means. The drag surface portions fold around the shaft 32,32′,32″ when the drag device 30,30′,30″ is stowed inside the inner catapult tube 8. The spring means unfolds the drag surface portions to extend generally radially outwardly from the shaft 30,30′,30″ when the drag device 32,32′,32″ is pulled out from the inner catapult tube 8.

The drag device of the invention may take a variety of forms. A first preferred embodiment of the drag device 30 is shown in FIGS. 1 and 9, a second preferred embodiment is shown in FIGS. 4–8, and a third preferred embodiment is shown in FIGS. 10–12. The first embodiment shown in FIGS. 1 and 9 is a ram air inflatable device 30 of a type that has been used in similar applications on clustered submunitions, to stabilize and slow aerodynamically unstable cylindrical explosive charges. The drag surface portions of the device 30 include a generally frustoconical surface 36 that tapers axially inwardly or forwardly from a blunt outer end to the inner edge of the shoulder 48 formed on shaft 32. A plurality, preferably four, of scoops 38 are positioned circumferentially around the frustoconical surface 36. The scoops 38 have an open end that faces forwardly, and taper rearwardly to merge into the frustoconical surface 36. The device 30 is inflated by means of air entering the scoops 38 and being directed to the interior of the inflatable device 30, causing it to be inflated like a balloon. The ram air pressure in the scoops 38 is sufficient to insure proper inflation of the device 30 upon deployment of the boom 8 and device 30. The drag surface portions 36,38 are preferably made from a material such as nylon or Kevlar (trademark).

The steel ribbon drag tuft arrangement of the second embodiment shown in FIGS. 4-8 is a novel concept for a high speed deployable drag device. The device 30' includes two axially spaced sets of spring steel ribbons 40. The ribbons 40 in each set are secured around the circumference of the center portion of the shaft 32' in a manner similar to the shingles on a roof. The ribbons 40 may be secured by a number of means, such as by electron beam welding. Each ribbon 40 has an inner end 42 that extends axially along the shaft 32' and is secured thereto. The circumferential positioning of the ribbons 40 around the shaft 32' enables the ribbons 40 to wrap spirally around the shaft 32' when in a stowed position and to extend generally radially from the shaft 32' when deployed. During assembly of the apparatus, the free ends of the ribbons 40 are tightly wrapped around the shaft 32' and then slipped into the inner catapult tube 8. When the device 30' is pulled out from the tube 8, the free ends of the ribbons 40 unwind and flair out to form drag surface portions consisting of a tuft-like appendage on the end of the boom 8. The ribbons 40 have sufficient stiffness to deploy properly but are not stiff enough to bind inside tube 8. The dimensions of each ribbon are, for example, in the order of one to two inches wide by 0.005 to 0.010 inch thick by three to four inches long.

The third embodiment of the drag device 30" shown in FIGS. 10-12 is a split tube/daisy petal drag tab arrangement of a type that has been used in similar applications on submunitions to slow and stabilize their descent. The drag surface portions of the device 30' are formed by a plurality of daisy petals 44 that fold together to form a split tube around the shaft 32" when in a stowed position and flare out in a manner similar to the petals of a flower when in a deployed position. The lower or outer ends of the petals 44 extend radially around and are secured to a sleeve 45 that is concentric with and axially slidable along the shaft 32". The opposite end of each petal 44 has one end of a guide wire 46 attached thereto to limit the radially outward flaring movement of the petal 44 upon deployment of the device 30". The other end of each wire 46 is attached to the shaft 32" adjacent to the end shoulder 48. The petals 44 are made from a spring steel to cause them to spring into their deployed position when the device 30" is pulled out from the inner catapult tube 8.

The boom/drag-device arrangement of the invention provides an effective means of preventing the seat 12 from pitching forward, and also provides some stabilization control about the yaw axis. As shown in the drawings, the booms 8 are deployed to extend rearwardly and somewhat upwardly from the seat 12. The booms 8 may be fixed in their deployed position or may be allowed to pivot about the axis of the pivot shaft 10. If it is desired to increase the yaw control provided by the boom/drag-device arrangement, such increased control might be obtained by fixing the booms 8 against pivotal movement about the axis of shaft 10. A more effective means of increasing the yaw control would be to skew the booms 8 a small amount so that they extend somewhat laterally outwardly, as well as rearwardly and somewhat upwardly, from the seat 12. This method of obtaining greater yaw control also has the advantage of decreasing the chances of the drogue parachute 22 becoming entangled with the boom 8. However, it has the disadvantage of making the pivotal mounting of the booms 8 more difficult since the pivot axis of the two booms 8 would be skewed but the pivoting of the two booms 8 would still need to be tied together by means of a flexible coupling to prevent nonsimultaneous deployment of the booms 8.

In the preferred embodiment of the method of the invention, the booms 8 and drag devices 30,30',30" are deployed upon separation of the seat 12 from the aircraft 2 as described above. Preferably, the pivoting of the booms 8 is caused by aerodynamic forces immediately after separation of tubes 4,8. This passive deployment has the advantage of not requiring any powered actuation and, therefore, of reducing the size and weight of the stabilizing apparatus. However, if desired, mechanical actuation means for pivoting booms 8 may be provided to insure proper deployment of booms 8. The rockets 18, 20 are operated upon seat/aircraft separation in a known manner. The boom/drag-device apparatus and the rockets 18,20 cooperate to control the seat attitude until the seat 12 has cleared the aircraft 2 and has slowed to a safe deceleration level. Following burnout of the rockets 18,20, the drogue parachute 22 is deployed to stabilize the seat 12. When deployed, the parachute 22 provides the primary stabilization control, but the boom/drag-device arrangement continues to provide supplementary attitude control.

It should be obvious to those skilled in the art to which this invention is addressed that the invention may be used to an advantage in a variety of situations, and that various modifications, changes, and omissions in form and detail may be made without departing from the spirit and scope of the invention as defined in the following claims.

What is claimed is:

1. Apparatus for stabilizing an aircraft ejection seat following separation from the aircraft, comprising:
   a boom attached to the upper rear portion of the seat;
   means for deploying the boom, essentially immediately after separation of the seat from the aircraft, into a position in which it extends generally rearwardly from the upper rear portion of the seat; and
   drag surface means carried by the boom for applying a small drag load to the upper portion of the seat;
   said boom and said drag surface means being positioned and dimensioned to raise the center of pressure of the seat toward the center of mass and counteract a tendency of the seat to pitch forward due to a pitching moment resulting from the center of pressure being below the center of mass.

2. Apparatus as recited in claim 1, in which the drag surface means comprises drag surface portions of a drag device; said device including a center axial shaft, and two axially spaced sets of spring steel ribbons, each said set including a plurality of said ribbons, each of which has an inner end that extends axially along and is secured to the shaft, said ribbons being positioned circumferentially around the shaft to wrap spirally around the shaft when in a stowed position and to extend generally radially from the shaft when deployed, and said ribbons of the two sets wrapping spirally in opposite directions.

3. Apparatus for stabilizing an aircraft ejection seat following separation from the aircraft, comprising:
   a boom attached to the upper rear portion of the seat;
   means for deploying the boom into a position in which it extends generally rearwardly from the upper rear portion of the seat; and drag surface means carried by the boom for applying a small drag load to the upper portion of the seat;

said boom and said drag surface means being positioned and dimensioned to raise the center of pressure of the seat toward the center of mass and counteract a tendency of the seat to pitch forward due to a pitching moment resulting from the center of pressure being below the center of mass; and said aircraft including ejecting means for ejecting the seat from the aircraft, said ejecting means including an outer catapult tube attached to the aircraft and an inner catapult tube telescopically received into the outer tube; and said boom being formed by the inner catapult tube.

4. Apparatus as recited in claim 3, in which the drag surface means comprises drag surface portions of a drag device that is telescopically received into the inner catapult tube prior to deployment of the boom; and which further comprises extending means for pulling the drag device, during deployment of the boom, into a position in which it extends axially outwardly from the inner catapult tube.

5. Apparatus as recited in claim 4, in which the extending means includes a lip carried by the drag device, and bearing means carried by the outer catapult tube at its outer end and positioned to engage the lip, just prior to separation of the inner tube from the outer tube, to pull the drag device out from the inner tube.

6. Apparatus as recited in claim 4, in which the drag device includes a center axial shaft; said drag surface portions fold around the shaft when the drag device is stowed inside the inner catapult tube; and the drag device further includes spring means for unfolding the drag surface portions to extend generally radially outwardly from the shaft when the drag device is pulled out from the inner catapult tube.

7. Apparatus as recited in claim 6, which the drag surface portions comprise a plurality of spring steel ribbons, each of which has an inner end that extends axially along and is secured to the shaft, said ribbons being positioned circumferentially around the shaft to wrap spirally around the shaft when in a stowed position and to extend generally radially from the shaft when deployed.

8. Apparatus for stabilizing an aircraft ejection seat following separation from the aircraft, said apparatus comprising the combination of:

a drogue parachute;

rocket means for controlling the seat attitude prior to deployment of the drogue parachute; and the improvement comprising:

a boom attached to the upper rear portion of the seat;

means for deploying the boom into a position in which it extends generally rearwardly from the upper rear portion of the seat; and drag surface means carried by the boom for applying a small drag load to the upper portion of the seat while the rocket means is being operated;

said boom and said drag surface means being positioned and dimensioned to raise the center of pressure of the seat toward the center of mass and counteract a tendency of the seat to pitch forward due to a pitching moment resulting from the center of pressure being below the center of mass.

9. Apparatus as recited in claim 8, in which the drag surface means comprises drag surface portions of a drag device; said device including a center axial shaft, and two axially spaced sets of spring steel ribbons, each said set including a plurality of said ribbons, each of which has an inner end that extends axially along and is secured to the shaft, said ribbons being positioned circumferentially around the shaft to wrap spirally around the shaft when in a stowed position and to extend generally radially from the shaft when deployed, and said ribbons of the two sets wrapping spirally in opposite directions.

10. Apparatus as recited in claim 8, in which said means for deploying the boom deploys the boom essentially immediately after separation of the seat from the aircraft.

11. Apparatus as recited in claim 8, in which said means for deploying the boom deploys the boom into a position in which it extends generally rearwardly from the upper rear portion of the seat when the seat is in a substantially upright position.

12. Apparatus as recited in claim 11, in which said means for deploying the boom deploys the boom essentially immediately after separation of the seat from the aircraft.

13. Apparatus for stabilizing an aircraft ejection seat following separation from the aircraft, said apparatus comprising the combination of:

a drogue parachute;

rocket means for controlling the seat attitude prior to deployment of the drogue parachute; and the improvement comprising:

a boom attached to the upper rear portion of the seat;

means for deploying the boom into a position in which it extends generally rearwardly from the upper rear portion of the seat; and drag surface means carried by the boom for applying a small drag load to the upper portion of the seat while the rocket means is being operated;

said boom and said drag surface means being positioned and dimensioned to raise the center of pressure of the seat toward the center of mass and counteract a tendency of the seat to pitch forward due to a pitching moment resulting from the center of pressure being below the center of mass; and said aircraft including ejecting means for ejecting the seat from the aircraft, said ejecting means including an outer catapult tube attached to the aircraft and an inner catapult tube telescopically received into the outer tube; and said boom being formed by the inner catapult tube.

14. Apparatus as recited in claim 13, in which the drag surface means comprises drag surface portions of a drag device that is telescopically received into the inner catapult tube prior to deployment of the boom; and which further comprises extending means for pulling the drag device, during deployment of the boom, into a position in which it extends axially outwardly from the inner catapult tube.

15. Apparatus as recited in claim 14, in which the extending means includes a lip carried by the drag device, and bearing means carried by the outer catapult tube at its outer end and positioned to engage the lip, just prior to separation of the inner tube from the outer tube, to pull the drag device out from the inner tube.

16. Apparatus as recited in claim 14, in which the drag device includes a center axial shaft; said drag surface portions fold around the shaft when the drag device is stowed inside the inner catapult tube; and the drag device further includes spring means for unfolding the drag surface portions to extend generally radially outwardly from the shaft when the drag device is pulled out from the inner catapult tube.

17. Apparatus as recited in claim 16, in which the drag surface portions comprise a plurality of spring steel ribbons, each of which has an inner end that extends axially along and is secured to the shaft, said ribbons being positioned circumferentially around the shaft to wrap spirally around the shaft when in a stowed position and to extend generally radially from the shaft when deployed.

18. A method of counteracting a tendency of an aircraft ejection seat to pitch forward following separation from the aircraft, said method comprising applying a small drag force to the upper portion of the seat to raise the center of pressure of the seat toward the center of mass by, essentially immediately after separation of the seat from the aircraft, deploying a boom having drag surface means to extend generally rearwardly from the upper portion of the seat, and maintaining the boom in a deployed position at least until the seat clears the tail of the aircraft.

19. A method of counteracting a tendency of an aircraft ejection seat to pitch forward following separation from the aircraft, said method comprising applying a small drag force to the upper portion of the seat to raise the center of pressure of the seat toward the center of mass by deploying a boom having drag surface means to extend generally rearwardly from the upper portion of the seat; in which the ejection seat is separated from the aircraft by means of a catapult system including an inner catapult tube attached to and extending downwardly from the upper rear portion of the seat and telescopically received into an outer catapult tube secured to the aircraft; in which the boom is formed by said inner tube; and in which the deploying of the boom includes pivoting the inner catapult tube into a position in which it extends generally rearwardly from the seat.

20. A method as recited in claim 19, in which the drag surface means includes portions of a drag device attached to the lower end of the inner catapult tube; and deploying the boom further includes extending the drag device from a stowed position in which it is telescopically received into the lower end of the inner catapult tube into a deployed position in which it extends axially outwardly from the inner catapult tube.

21. A method as recited in claim 20, in which deploying the boom further includes allowing drag surface portions of the drag device to spring from a folded stowed position into a generally radially extending deployed position.

22. A method of stabilizing an ejection seat following separation from an aircraft, comprising:
operating rockets carried by the seat to control the seat attitude; and
deploying a drag device to extend generally rearwardly from the upper portion of the seat while the rockets are being operated, to apply a small drag force to the upper portion of the seat and raise the center of pressure toward the center of mass, to thereby counteract a tendency of the seat to pitch forward and, in turn, reduce the need for rocket propellant;
in which the ejection seat is separated from the aircraft by means of a catapult system including an inner catapult tube attached to and extending downwardly from the upper rear portion of the seat and telescopically received into an outer catapult tube secured to the aircraft; in which the drag device is attached to the lower end of the inner catapult tube; and in which the deploying of the drag device includes pivoting the inner catapult tube into a position in which it extends generally rearwardly from the seat.

23. A method as recited in claim 22, in which deploying the drag device further includes extending the drag device from a stowed position in which it is telescopically received into the lower end of the inner catapult tube into a deployed position in which it extends axially outwardly from the inner catapult tube.

24. A method as recited in claim 23, in which deploying the drag device further includes allowing drag surface portions of the device to spring from a folded stowed position into a generally radially extending deployed position.

25. A method as recited in claim 24, in which the rockets are operated to control the seat attitude until the seat has cleared the aircraft and has slowed to a safe deceleration level; and which further comprises deploying a drogue parachute to stabilize the seat following operation of the rockets.

26. Apparatus for stabilizing an aircraft ejection seat following separation from the aircraft, comprising:
a boom attached to the upper rear portion of the seat;
means for deploying the boom into a position in which it extends generally rearwardly from the upper rear portion of the seat when the seat is in a substantially upright position; and
drag surface means carried by the boom for applying a small drag load to the upper portion of the seat;
said boom and said drag surface means being positioned and dimensioned to, when the seat is in said substantially upright position, raise the center of pressure of the seat toward the center of mass and counteract a tendency of the seat to pitch forward due to a pitching moment resulting from the center of pressure being below the center of mass.

27. Apparatus as recited in claim 26 in which said means for deploying the boom deploys the boom essentially immediately after separation of the seat from the aircraft.

28. A method of counteracting a tendency of an aircraft ejection seat to pitch forward following separation from the aircraft, said method comprising applying a small drag force to the upper portion of the seat when the seat is in a substantially upright position to raise the center of pressure of the seat toward the center of mass by deploying a boom having drag surface means into a position in which it extends generally rearwardly from the upper portion of the seat while the seat is in a substantially upright position.

29. A method as recited in claim 28, in which the deploying of the boom is carried out essentially immediately after separation of the seat from the aircraft, and which comprises maintaining the boom in a deployed position at least until the seat clears the tail of the aircraft.

* * * * *

UNITED STATES PATENT AND TRADEMARK OFFICE
CERTIFICATE OF CORRECTION

PATENT NO. : 4,749,153

DATED : June 7, 1988

INVENTOR(S) : Gerald F. Herndon

It is certified that error appears in the above-identified patent and that said Letters Patent are hereby corrected as shown below:

On the Cover Page, under "References Cited, U.S. PATENT DOCUMENTS", the following should be added:

```
2,751,171   6/1956    Martin
2,829,850   4/1958    Culver
3,554,472   1/1971    McIntyre et al.
3,679,157   7/1972    Roberts et al.
3,979,088   9/1976    McCormick
4,017,043   4/1977    Barzda
4,261,535   4/1981    Swanson
4,319,723   3/1982    Schultz
4,480,806   11/1984   Duncan
```

Column 5, line 48, "apparant" should be -- apparent --.

Claim 7, column 11, line 37, -- in -- should be inserted following "claim 6,".

Signed and Sealed this

Seventh Day of February, 1989

Attest:

DONALD J. QUIGG

*Attesting Officer*  *Commissioner of Patents and Trademarks*